(12) United States Patent
Wu et al.

(10) Patent No.: US 8,379,693 B2
(45) Date of Patent: Feb. 19, 2013

(54) METHOD FOR DE-SPREADING QUADRATURE PSEUDORANDOM NOISE

(75) Inventors: Jiao Wu, Beijing (CN); Yu Xin, Shenzhen (CN); Guoping Xu, Beijing (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 865 days.

(21) Appl. No.: 12/516,468

(22) PCT Filed: Dec. 6, 2006

(86) PCT No.: PCT/CN2006/003312
§ 371 (c)(1),
(2), (4) Date: May 27, 2009

(87) PCT Pub. No.: WO2008/067689
PCT Pub. Date: Jun. 12, 2008

(65) Prior Publication Data
US 2010/0046587 A1 Feb. 25, 2010

(51) Int. Cl.
*H04B 1/00* (2006.01)
(52) U.S. Cl. ........................ 375/147; 375/130
(58) Field of Classification Search ............ 375/147, 375/146, 141, 130, 149; 370/342, 204, 335, 370/209
See application file for complete search history.

(56) References Cited

U.S. PATENT DOCUMENTS

| | | | |
|---|---|---|---|
| 6,084,851 A | 7/2000 | Iwasaki | |
| 6,215,813 B1 * | 4/2001 | Jones et al. | 375/146 |
| 6,490,267 B1 | 12/2002 | Kim et al. | |
| 2002/0191569 A1 * | 12/2002 | Sung et al. | 370/335 |

FOREIGN PATENT DOCUMENTS

CN 1375969 A 10/2002

OTHER PUBLICATIONS

3rd Generation Partnership Program 2, cdma2000 High Rate Packet Data Air Interface Specification, Oct. 2000, Version 2.0.*
3rd Generation Partnership program 2, CDMA200 high Rate Packet Data Air Interface Specification, Oct. 2000, Version 2.0.*
3rd Generation Partnership Program 2, CDMA2000 High Rate Broadcast-Multicast Packet Data Air Interface Specification, Feb. 2006, Version 1.0.*
3rd Generation Partnership Program 2, CDMA200 High Rate Data Packet Air Interface Specification, Oct. 2000, Ver. 2.0.*
3rd Generation Parnership Program 2, CDMA2000 High Rate Broadcast-Multicast Packet Data Air Interface Specification, Feb. 2006, Ver. 1.0.*

* cited by examiner

*Primary Examiner* — David C. Payne
*Assistant Examiner* — Wednel Cadeau
(74) *Attorney, Agent, or Firm* — Bright IP Law Offices

(57) ABSTRACT

The present invention discloses a method for de-spreading quadrature pseudorandom noise, which including: inputting data sequences I' and Q', and inputting pseudorandom noise sequences PNI and PNQ, on which quadrature pseudorandom noise de-spreading operation will be performed; in each timeslot, extracting continuously 2048 codeword from each pseudorandom noise sequence PNI and each pseudorandom noise sequence PNQ respectively, performing time-division de-multiplexing operation on the 2048 codeword respectively, and obtaining pseudorandom noise sequences PNI' and PNQ' both with a length of 1600 codeword; performing quadrature pseudorandom noise de-spreading operation on the pseudorandom noise sequences PNI' and PNQ' and the data sequences I' and Q' with a length of 1600 codeword input in the timeslot, and then outputting data sequences I and Q. The invention operates the input sequences to be performed with quadrature PN de-spreading. Thereby, system transmission requirement is satisfied, and complexity of transmitting end is relatively lowered.

10 Claims, 6 Drawing Sheets

Active Slot Containing
EBCMCS Traffic

METHOD FOR DE-SPREADING QUADRATURE PSEUDORANDOM NOISE

FIELD OF THE INVENTION

The present invention relates to enhanced broadcast-multicast service in CDMA (Code Division Multiple Access) wireless communication systems, particularly, to a method for de-spreading quadrature pseudorandom noise.

BACKGROUND OF THE INVENTION

The 3rd Generation mobile communication system (IMT-2000) and the evolved system thereof, i.e. future mobile communication system, are designed to be an advanced mobile communication system capable of overcoming the main disadvantage of the first Generation and 2nd Generation mobile communication system thoroughly. An outstanding feature of the 3rd Generation communication system is to enable a personal terminal user to realize high-quality mobile communication and transmission of any information, with any person, in any way, at any time and at any place in the worldwide, in the future mobile communication system.

The 3rd Generation mobile communication system mainly consists of TD-SCDMA formulated by China, CDMA2000 formulated by the U.S.A. and WCDMA formulated by Europe. CDMA2000 Standard is widely used in North America and many other places around the world, and in order to further improve the CDMA2000 Standard, the evolved standards of CDMA2000 have been formulated: CDMA2000 EV/DO and CDMA2000 EV/DV.

In EV/DO system, EBCMCS (Enhanced BroadCast MultiCast Service) is proposed, and the EBCMCS system is mainly used to transmit broadcast message to mobile stations in a whole coverage area. The architecture of EBCMCS channel is illustrated in FIG. 1: firstly, perform channel coding on the data information input, while the channel coding is ⅕ or ⅓ Turbo coding 101, then, perform channel scrambling, interleaving, repeating and punching 102 on the data been coded, dividing the coded data into two ways of I and Q through 16 QAM (quadrature Amplitude Modulation) 103, and perform OFDM (Orthogonal Frequency Division Multiplexing) modulating process on the two ways of I and Q respectively, then the data passes through quadrature PN (Pseudo-random Noise) de-spreading module 108, and perform time-division multiplexing on the data and pilot and MAC (Media Access Control) information, as shown in FIG. 2, and finally, sending the data through quadrature PN spreading module 203 with Base Station (BS for short) information. Wherein, the OFDM modulation module comprises mainly: inserting guard interval and pilot module 104, QPSK (quadrature Phase Shift Keying) spreading module 105, IFFT (Inverse Fast Fourier Transform) module 106, and inserting cyclic prefix module 107. Wherein, the QPSK spreading module 105 mainly functions to reduce the Peak-to-Average Ratio of OFDM.

In EBCMCS, to make it convenient for the mobile station to demodulate broadcast information, in the previous downlink, information about the BS, which is added to the sending sequence through the quadrature PN spreading module, needs to be shielded. Therefore, before each timeslot is generated, a quadrature PN de-spreading module needs to be added, and as shown in FIG. 1 and FIG. 2, perform quadrature PN de-spreading processing to the data information input, and then input the data information to the TDM (Time Division Multiplexing) module and perform time-division multiplexing with Pilot Channel and MAC information, and finally, add a BS identifier through the quadrature PN spreading module, to form and send a complete timeslot. The simplified block diagram of the whole transmitting end is shown in FIG. 2.

The quadrature PN spreading mode is explained in the EBCMCS Protocol (3GPP2 C.S0054-A Version 1.0 cdma2000 High Rate Broadcast Multicast Packet Data Air Interface Specification of 3GPP2). deep research on the quadrature PN de-spreading mode has been made, and a new quadrature PN de-spreading mode is proposed in this application.

SUMMARY OF THE INVENTION

The present invention mainly aims to provide a method for de-spreading quadrature pseudorandom noise, to lower complexity of a transmitting end.

To realize the object, according to the first aspect of the invention, a method for de-spreading quadrature pseudorandom noise is provided, including the following steps:

S102, inputting data sequences I' and Q', and inputting pseudorandom noise sequences PNI and PNQ, on which quadrature PN de-spreading operation will be performed;

S104, in each timeslot, extracting continuously 2048 codeword from each pseudorandom noise sequence PNI and each pseudorandom noise sequence PNQ respectively, performing time-division de-multiplexing operation on the 2048 codeword respectively, and obtaining pseudorandom noise sequences PNI' and PNQ' both with a length of 1600 codeword; and S106, performing quadrature pseudorandom noise de-spreading operation on the pseudorandom noise sequences PNI' and PNQ' and the data sequences I' and Q' with a length of 1600 codeword input in the timeslot, and then outputting data sequences I and Q.

The pseudorandom noise sequences PNI and PNQ both with 32768 codeword, extracting 2048 codeword in each timeslot respectively, and extracting another immediate following 2048 codeword in sequence from the next timeslot; after the whole pseudorandom noise sequence has been extracted, starts extraction again from the beginning, and the extraction is circled every other 16 timeslots.

The pseudorandom noise sequences PNI and PNQ are respectively generated by the following multinomials:

$$PI(x)=x^{15}+x^{13}+x^9+x^8+x^7+x^5+1,$$

$$PQ(X)=x^{15}+x^{12}+x^{11}+x^{10}+x^6+x^5+x^4+x^3+1,$$

Wherein, when fourteen "0" appears continuously, one "0" will be added automatically.

Calculation formula for the quadrature PN de-spreading operation is: I=½(I'PNI'+Q'PNQ'), and Q=½(Q'PNI'−I'PNQ').

The pseudorandom noise sequences PNI and PNQ are sequences which consist of $$\pm \frac{1}{\sqrt{2}}.$$

The calculation formula for quadrature PN de-spreading operation is:

$$I = \frac{1}{\sqrt{2}}(I'PNI' + Q'PNQ'), \text{ and}$$

$$Q = \frac{1}{\sqrt{2}}(Q'PNI' - I'PNQ').$$

After S106, time-division multiplexing and quadrature PN spreading are performed on the data sequences I and Q; and then sending the data sequences I and Q. Time-division multiplexing is performed on the data sequences I and Q with pilot and MAC information. The pseudorandom noise sequences PNI and PNQ is adopted in the qauadrature pseudorandom noise spreading.

The quadrature PN de-spreading method is applicable to Enhanced BroadCast MultiCast Service.

To realize the above objective, according to the second aspect of the invention, a broadcast method for Enhanced BroadCast MultiCast Service is provided, including the following steps:

S202, performing channel coding, channel scrambling, interleaving, repeating and punching, 16 QAM, OFDM (orthogonal frequency division multiplexing), on data flow input from physical layer, and generating data sequences I' and Q'

S204, performing quadrature pseudorandom noise de-spreading on the data sequences I' and Q' by the method for de-spreading quadrature PN according to above, and outputting data sequences I and Q; and S206, performing time-division multiplexing on the data sequences I and Q with pilot and MAC information, adding base station information through quadrature PN spreading, and transmitting broadcast and multicast data thereby.

With above technical solution, operations can be performed on the input sequences on which quadrature PN de-spreading will be performed. Thereby, system transmission requirement is satisfied, and complexity of a transmitting end is relatively lowered.

BRIEF DESCRIPTION OF THE DRAWINGS

The appended drawings intend to help further understanding of the invention, and constitute part of the application. The illustrative embodiments of the invention and their description are used to explain the invention, and shall not be construed as improper limitations on the invention. In the appended drawings.

DETAILED DESCRIPTION OF THE PREFERRED EMBODIMENTS

Embodiments of the present invention will be described in details with reference to the appended drawings, is to be given below. Wherein, if not conflict, the embodiments and the technical features of the embodiments can be combined.

Figure 3:
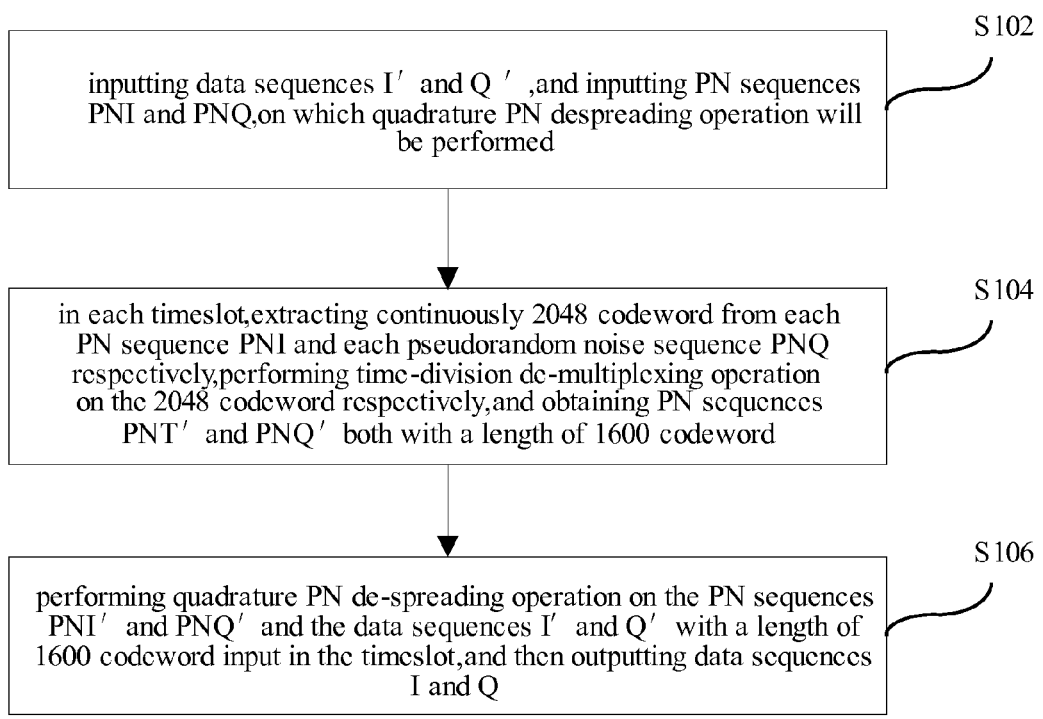
FIG. 3 is a flow chart of the method for de-spreading quadrature pseudo-random noise according to the present invention.

Referring to FIG. 3, the method for de-spreading quadrature PN according to the present invention includes the following steps:

S102, inputting data sequences I' and Q', and inputting pseudorandom noise sequences PNI and PNQ, on which a quadrature PN de-spreading operation will be performed;

S104, in each timeslot, extracting continuously 2048 codeword from each pseudorandom noise sequence PNI and each pseudorandom noise sequence PNQ respectively, performing time-division de-multiplexing operation on the 2048 codeword respectively, and obtaining pseudorandom noise sequences PNI' and PNQ' both with a length of 1600 codeword; and S106, performing quadrature pseudorandom noise de-spreading operation on the pseudorandom noise sequences PNI' and PNQ' and the data sequences I' and Q' with a length of 1600 codeword input in the timeslot, and then outputting data sequences I and Q.

The pseudorandom noise sequences PNI and PNQ both with 32768 codeword, extracting 2048 codeword in each timeslot respectively, and extracting another immediate following 2048 codeword in sequence from the next timeslot; after the whole pseudorandom noise sequence has been extracted, starts extraction again from the beginning, and the extraction is circled every other 16 timeslots.

Pseudorandom noise sequences PNI and PNQ are respectively generated by the following multinomials:

$$PI(x)=x^{15}+x^{13}+x^9+x^8+x^7+x^5+1, \text{ and}$$

$$PQ(X)=x^{15}+x^{12}+x^{11}+x^{10}+x^6+x^5+x^4+x^3+1,$$

Wherein, when fourteen "0" appears continuously, one "0" will be added automatically.

The calculation formula for quadrature PN de-spreading operation is:

$$I=\tfrac{1}{2}(I'PNI'+Q'PNQ'), \text{ and } Q=\tfrac{1}{2}(Q'PNI'-I'PNQ').$$

Pseudorandom noise sequences PNI and PNQ consist of $$\pm \frac{1}{\sqrt{2}}.$$

The calculation formula for quadrature PN de-spreading operation is:

$$I = \frac{1}{\sqrt{2}}(I'PNI' + Q'PNQ'), \text{ and}$$

$$Q = \frac{1}{\sqrt{2}}(Q'PNI' - I'PNQ').$$

After S106, time-division multiplexing and quadrature PN spreading are performed on data sequences I and Q which will be sent then. Time-division multiplexing is performed on data sequences I and Q with pilot and MAC information. The pseudorandom noise sequences PNI and PNQ are adopted in the qauadrature pseudorandom noise spreading.

The quadrature PN de-spreading method is applicable to Enhanced BroadCast MultiCast Service.

The broadcast method for EBCMCS according to the present invention comprises the following steps:

S202, performing channel coding, channel scrambling, interleaving, repeating and punching, 16 QAM, OFDM, on data flow input from physical layer, and generating data sequences I' and Q';

S204, performing quadrature PN de-spreading on data sequences I' and Q' according to the method for de-spreading quadrature PN as shown in FIG. 3, and outputting data sequences I and Q; and S206, performing time-division multiplexing on the data sequences I and Q with pilot and MAC information, adding base station information through quadrature PN spreading, and transmitting broadcast and multicast data thereby.

The invention relates to the part of Air Interface in CDMA (Code Division Multiple Access) communication field, in particular to the part of Air Interface involved in Enhanced BroadCast MultiCast Service.

Figure 4:
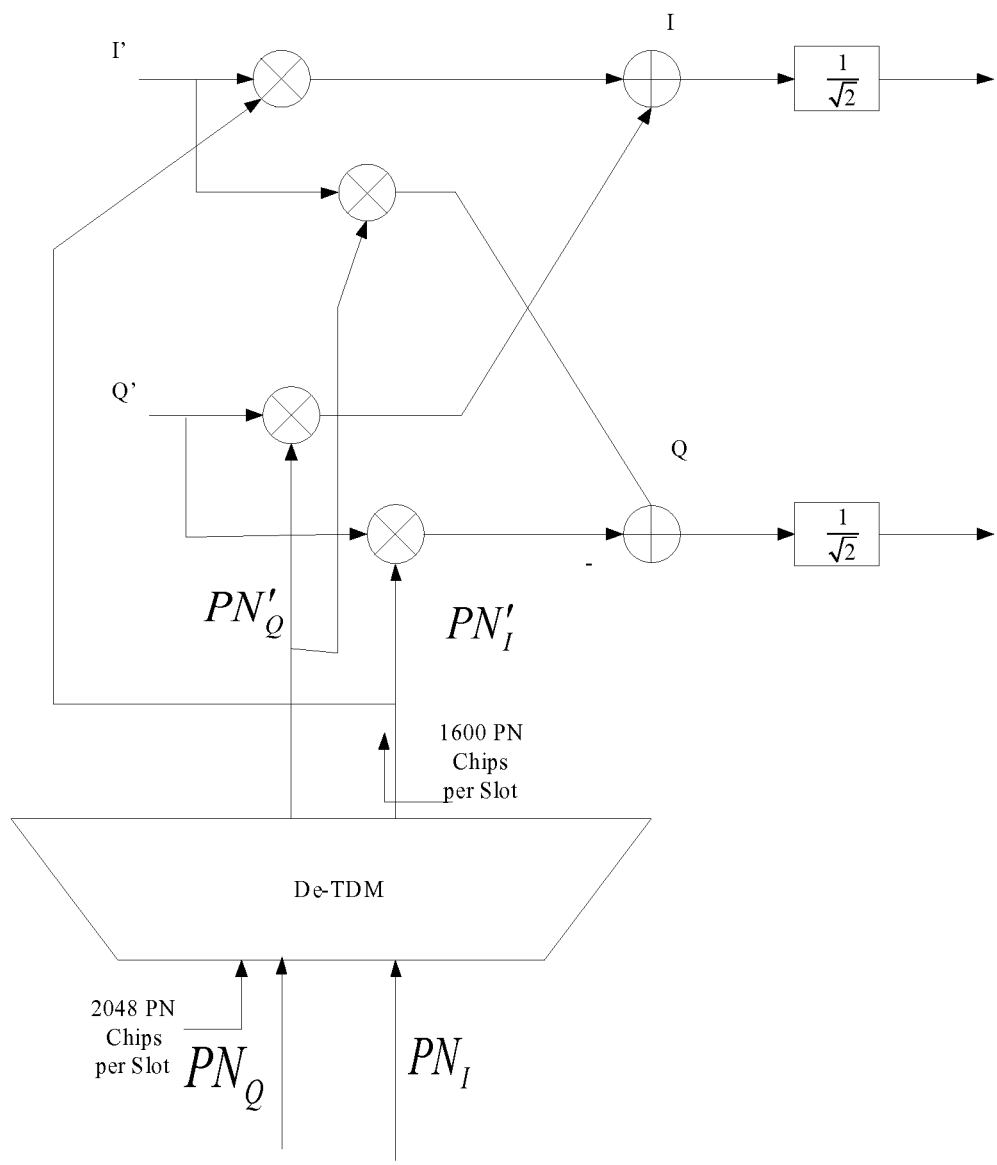
FIG. 4 is a schematic chart of realizing quadrature PN de-spreading according to the embodiment of the invention.

The invention proposes a new quadrature PN de-spreading mode which completes the whole quadrature PN de-spreading function by processing the two ways of input PN sequences I and Q. The mode is easy to be realized and is less complex than processing the input data sequences. FIG. 4 illustrates the block diagram for realizing the mode.

1) Suppose I' and Q' are input data, $PN_I$ and $PN_Q$ are respectively two ways of PN sequences I and Q to be performed with quadrature PN de-spreading operation.

2) In a timeslot, 2048 codeword are extracted continuously from a short PN sequence with a length of 32768 codeword, to perform operation. However, to shield the effect of the quadrature PN spreading, it is not just simply to continuously extract 2048 codeword when the quadrature PN de-spreading is performed. As the length of data sequences input in each timeslot is not 2048 codeword but 1600 codeword (the length is only extended to 2048 codeword after TDM). Therefore, only 1600 codeword can be extracted from the 2048 codeword of the sequence to be performed with quadrature PN spreading for quadrature PN de-spreading operation, according to the time-division de-multiplexing principle.

3) Therefore, first let the 2048 codeword of the input $PN_I$ and $PN_Q$ pass through the time-division de-multiplexing module, and the time-division de-multiplexing principle is determined according to FIG. 4, and then the quadrature PN de-spreading operation shown in FIG. 4 is performed on the extracted 1600 codeword, to obtain data sequences I and Q.

4) Perform TDM and quadrature PN spreading operation on data sequences I and Q which are then sent.

5) The basic principle of the method proposed herein lies in processing the input sequences $PN_I$ and $PN_Q$ to be performed with quadrature PN de-spreading to satisfy transmission requirement of the system and lower the complexity of the transmitting end, instead of processing data to satisfy transmission requirement.

Referring to FIG. 4, the quadrature PN de-spreading is to be described in details:

1) Describe the short-code PN sequences involved in the quadrature PN de-spreading. According to the EBCMCS protocol, the two ways of short PN sequences I and Q are respectively generated by the following two multinomials:

$$P_I(x)=x^{15}+x^{13}+x^9+x^8+x^7+x^5+1 \quad (1)$$

$$P_Q(x)=x^{15}+x^{12}+x^{11}+x^{10}+x^6+x^5+x^4x^3+1 \quad (2)$$

According to (1) and (2), the length of the short-code PN sequence should have been $2^{15}-1$, but it is specified in the protocol that when fourteen "0" appears continuously, one "0" will be added automatically, so the length of the short PN sequence becomes $2^{15}=32768$.

Figure 6:
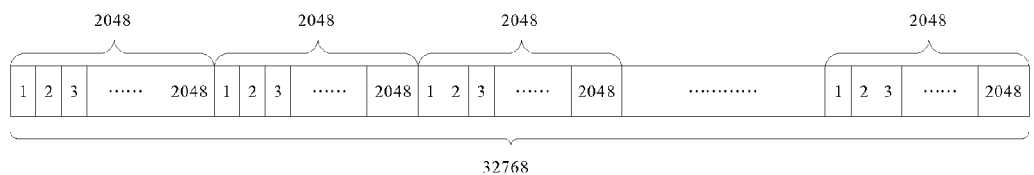
FIG. 6 is an illustrative chart of using mode of short PN sequence according to the embodiment of the invention.

2) The use of the short PN sequence is continuous, as shown in FIG. 6. The $1^{st}$ to the $2048^{th}$ codeword of the short PN sequence are extracted when the first timeslot is transmitted; the $2049^{th}$ to the $4096^{th}$ codeword are extracted when the second timeslot is transmitted; extraction is conducted in turn, and after one whole short PN sequence has been extracted, extraction is started from the $1^{st}$ codeword cyclically. Since the length of the short PN sequence is 32768 codeword, 16 times the length of 2048 codeword, the short PN sequence will be cyclically extracted for a round every other 16 timeslots.

3) According to the EBCMCS protocol, the calculation formula for quadrature PN spreading is expressed by the following two formulas:

$$I'=IPN_I-QPN_Q \quad (3)$$

$$Q'=IPN_Q+QPN_I \quad (4)$$

Figure 7:
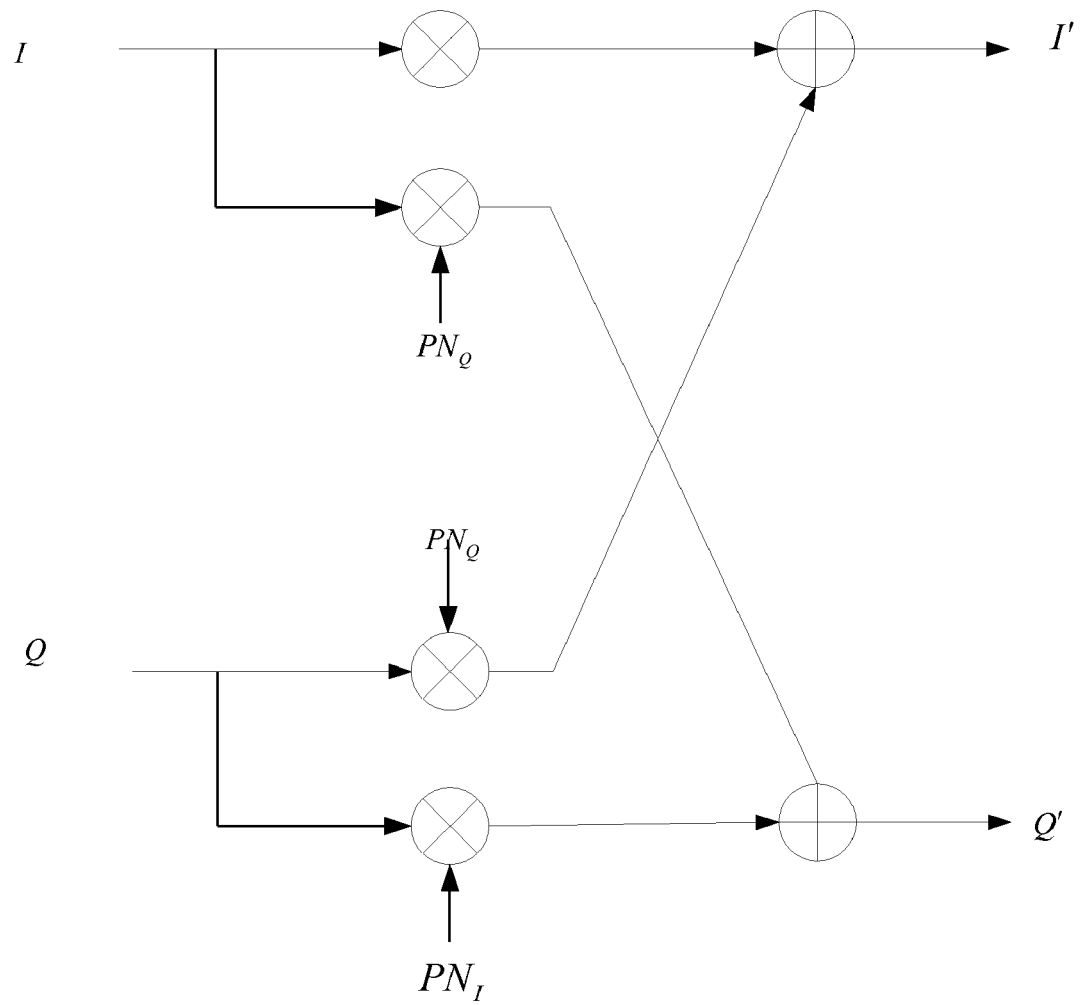
FIG. 7 is a block diagram of quadrature PN spreading according to the embodiment of the invention.

According to formulas (3) and (4), FIG. 7 can be used to show the block diagram of the quadrature PN spreading, wherein, I and Q are input sequences to be performed with quadrature PN spreading, while I' and Q' are output sequences having been performed with quadrature PN spreading. According to the downlink channel architecture specified in the EBCMCS protocol, I and Q both have 2048 codeword for one timeslot. $PN_I$ and $PN_Q$ are respectively two ways of PN sequences I and Q to be performed with quadrature PN spreading, and $PN_I$ and $PN_Q$ are extracted according to the principle in 2).

4) According to calculation formulas (3) and (4) of quadrature PN spreading, the formulas of quadrature PN de-spreading can be deduced as shown in the following formulas:

$$I=\tfrac{1}{2}(I'PN_I+Q'PN_Q) \quad (5)$$

$$Q=\tfrac{1}{2}(Q'PN_I-I'PN_Q) \quad (6)$$

Wherein, I and Q are input sequences having performed with quadrature PN de-spreading, I' and Q' are output sequences to be performed with quadrature PN de-spreading. $PN_I$ and $PN_Q$ are respectively two ways of PN sequences I and Q to be performed with quadrature PN de-spreading, and $PN_I$ and $PN_Q$ are extracted according to the principle in 2). Herein, in one timeslot, $PN_I$ and $PN_Q$ are respectively the same as $PN_I$ and $PN_Q$ of quadrature PN spreading.

Figure 1:
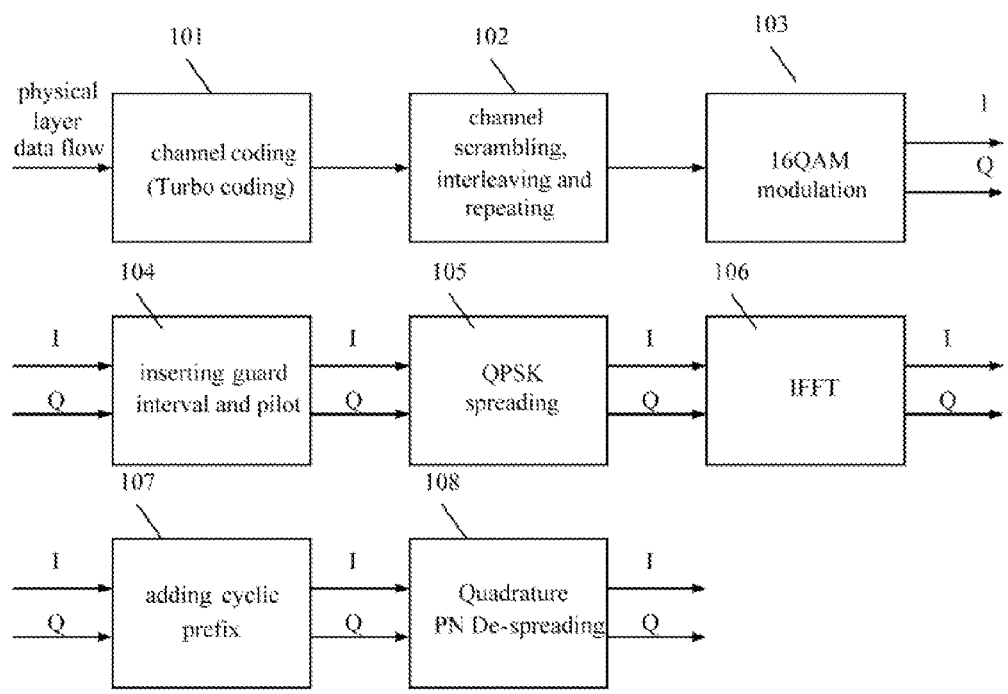
FIG. 1 is a schematic view of EBCMCS Channel architecture.
Figure 2:
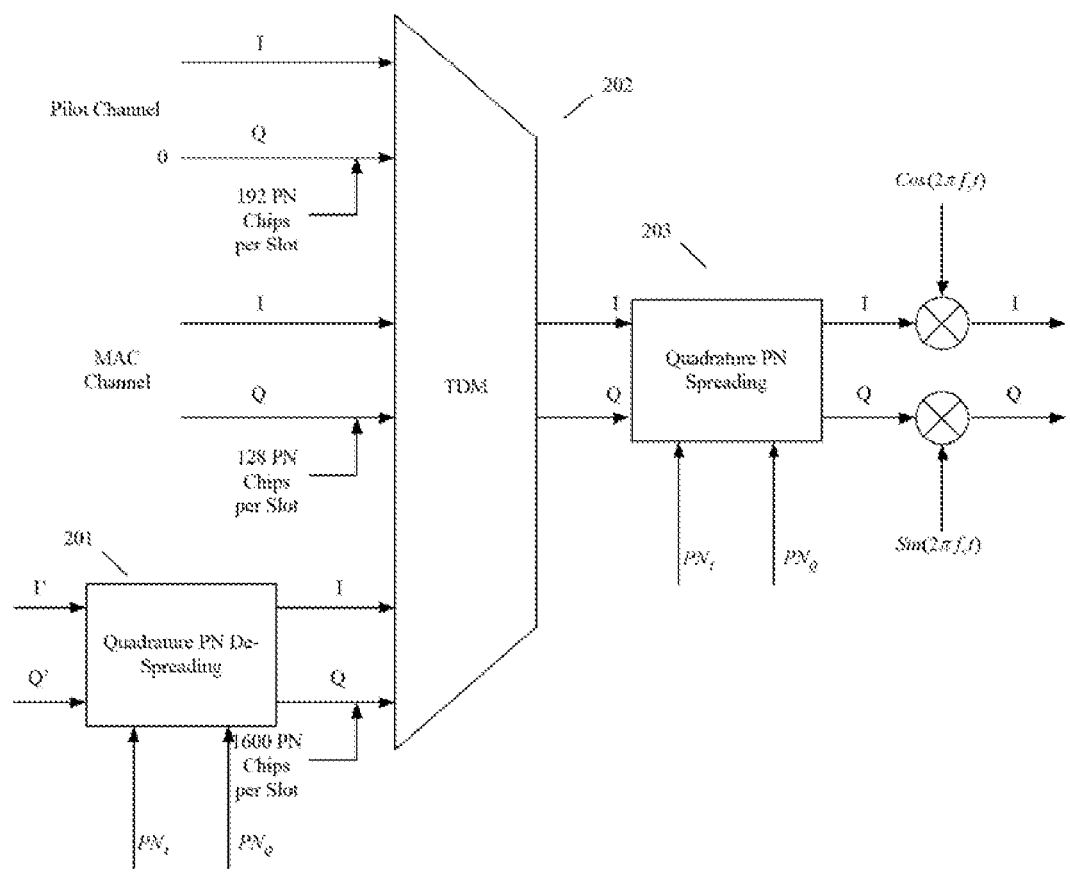
FIG. 2 is a simplified block diagram of EBCMCS transmitting end.

5) As the EBCMCS protocol rules that the time-division multiplexing module follows the quadrature PN de-spreading module, as shown in FIG. 2, the length of the two ways of data sequences I and Q in each timeslot entering the quadrature PN de-spreading module is 1600 codeword. Therefore, formulas (5) and (6) may be rewritten as:

$$I=\tfrac{1}{2}(I'PN'_I+Q'PN'_Q) \quad (7)$$

$$Q=\tfrac{1}{2}(Q'PN'_I-I'PN'_Q) \quad (8)$$

Figure 5:
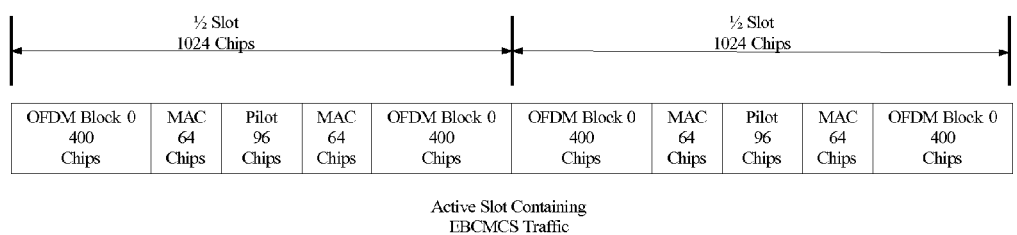
FIG. 5 is a schematic chart of TDM mode according to the embodiment of the invention.

Wherein, $PN'_I$ and $PN'_Q$ are two ways of short PN sequences I and Q, after performing time division de-multiplexing on $PN_I$ and $PN_Q$. The time-division de-multiplexing principle is determined by the inverse process according to FIG. 5. I' and Q' are input data sequences to be operated. We may deduce that sequences I' and Q' have a length of 1600 codeword for each timeslot, for the current sequences have not gone through the time-division multiplexing module. Thus, the block diagram of the overall operation can be shown as FIG. 4.

6) As the EBCMCS Protocol specifies that sequences $PN_I$ and $PN_Q$ consist of $$\pm \frac{1}{\sqrt{2}}.$$

(7) and (8) may be rewritten as:

$$I = \frac{1}{\sqrt{2}}(I'PNI'_I + Q'PN'_Q) \quad (9)$$

$$Q = \frac{1}{\sqrt{2}}(Q'PNI'_I - I'PN'_Q) \quad (10)$$

7) According to the above principles, the mode for realizing the overall quadrature PN de-spreading can be illustrated in FIG. 4.

According to the embodiment of the present invention, computer program product for intra-system handoff is also provided. The computer program product comprises instructions for causing a processor to perform the steps shown in FIG. 3. For the person skilled in the art, it is easy to be achieved by referring to the embodiments described above and the figures, so details will be omitted.

The present invention has been shown with reference to the above-described embodiments thereof, and it is not to be limited by the above embodiments. It should be understood by those skilled in the art that various alterations and changes may be made within the spirit and scope of the invention. All modifications, equivalent substitutions or improvement made therein is intended to be embraced in the claims of this invention.

What is claimed is:

1. A method for de-spreading quadrature pseudorandom noise, comprising:
    inputting data sequences I' and Q', and inputting pseudorandom noise sequences $PN_I$ and $PN_Q$, on which quadrature pseudorandom noise de-spreading operation will be performed;
    in each timeslot, extracting continuously 2048 codeword from each pseudorandom noise sequence $PN_I$ and each pseudorandom noise sequence $PN_Q$ respectively, performing time-division de-multiplexing operation on the 2048 codeword respectively, and obtaining pseudorandom noise sequences $PN_I'$ and $PN_Q'$ both with a length of 1600 codeword; and
    performing quadrature pseudorandom noise de-spreading operation on the pseudorandom noise sequences $PN_I'$ and $PN_Q'$ and the data sequences I' and Q' with a length of 1600 codeword input in the timeslot, and then outputting data sequences I and Q, wherein subsequent time-division multiplexing and quadrature pseudorandom noise spreading are performed on the data sequences I and Q before the data sequences I and Q are sent.

2. The method for de-spreading quadrature pseudorandom noise according to claim 1, wherein the pseudorandom noise sequences $PN_I$ and $PN_Q$ both with 32768 codeword, extracting 2048 codeword in each timeslot respectively, and extracting another immediate following 2048 codeword in sequence from the next timeslot; after the whole pseudorandom noise sequence has been extracted, starts extraction again from the beginning, and the extraction is circled every other 16 timeslots.

3. The method for de-spreading quadrature pseudorandom noise according to claim 2, wherein the pseudorandom noise sequences $PN_I$ and $PN_Q$ are respectively generated by the following multinomial:

$P_I(x)=x^{15}+x^{13}+x^9+x^8+x^7+x^5+1$, $P_Q(x)=x^{15}+x^{12}+x^{11}+x^{10}+x^6+x^5+x^4+x^3+1$ wherein, when fourteen "0" appears continuously, one "0" will be added automatically.

4. The method for de-spreading quadrature pseudorandom noise according to claim wherein the calculation formula for the quadrature pseudorandom noise de-spreading operation is:

$$I = \frac{1}{\sqrt{2}}(I'PNI' + Q'PNQ'),$$

$$Q = \frac{1}{\sqrt{2}}(Q'PNI' - I'PNQ').$$

5. The method for de-spreading quadrature pseudorandom noise according to claim 1, wherein the pseudorandom noise sequences $PN_I$ and $PN_Q$ are sequences which consist of $$\pm \frac{1}{\sqrt{2}}.$$

6. The method for de-spreading quadrature pseudorandom noise according to claim 5, wherein the calculation formula for the quadrature pseudorandom noise de-spreading operation is:

$$I = \frac{1}{\sqrt{2}}(I'PNI' + Q'PNQ'),$$

$$Q = \frac{1}{\sqrt{2}}(Q'PNI' - I'PNQ').$$

7. The method for de-spreading quadrature pseudorandom noise according to claim 1, wherein time-division multiplexing is performed on the data sequences I and Q with pilot and MAC information.

8. The method for de-spreading quadrature pseudorandom noise according to claim 1, wherein the pseudorandom noise sequences $PN_I$ and $PN_Q$ is adopted in the quadrature pseudorandom noise spreading performed on the data sequences I and Q.

9. The method for dc-spreading quadrature pseudorandom noise according to any one of claims 1-6, 7-8 wherein the quadrature pseudorandom noise de-spreading method is applicable to Enhanced Broadcast MultiCast Service.

10. A broadcast method for Enhanced BroadCast MultiCast Service, comprising:
    performing channel coding, channel scrambling, interleaving, repeating and punching, 16 QAM, OFDM, on data flow input from physical layer, and generating data sequences I' and Q';
    performing quadrature pseudorandom noise de-spreading on the data sequences I' and Q' by the method for de-spreading quadrature pseudorandom noise according to claim 1, and outputting data sequences I and Q; and
    performing time-division multiplexing on the data sequences I and Q with pilot and MAC information, adding base station information through quadrature pseudorandom noise spreading, and transmitting broadcast and multicast data thereby.

* * * * *